July 25, 1967     E. D. PHILLIPS     3,332,566
ACCESSORIES FOR CHEMICAL GLASSWARE APPARATUS
Filed March 31, 1965
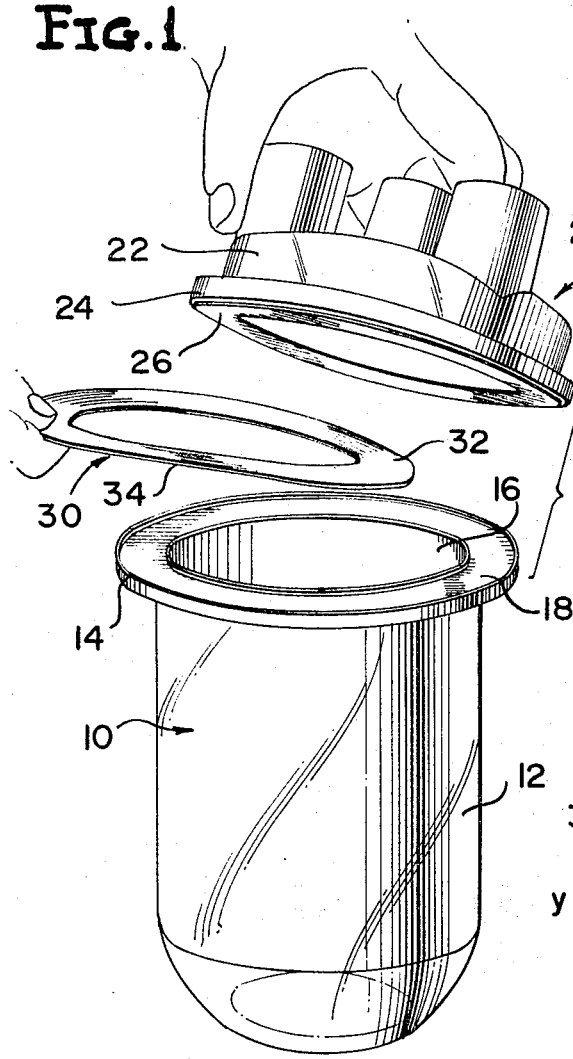
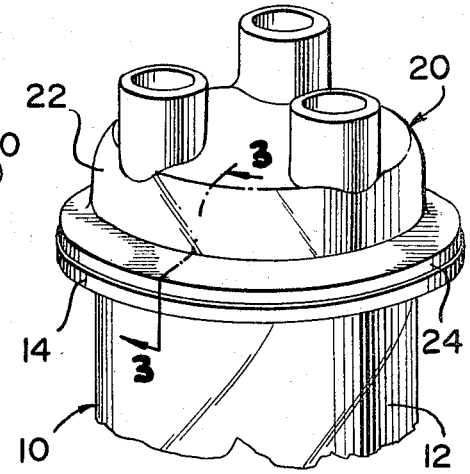
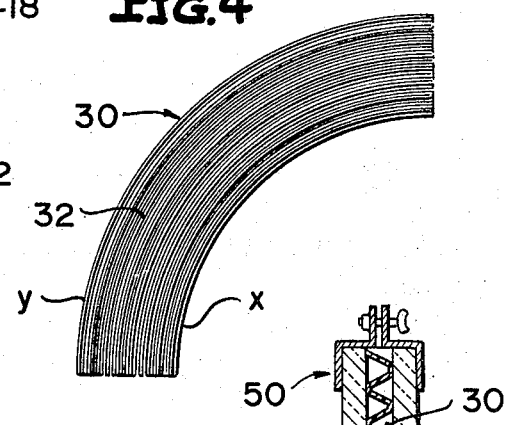
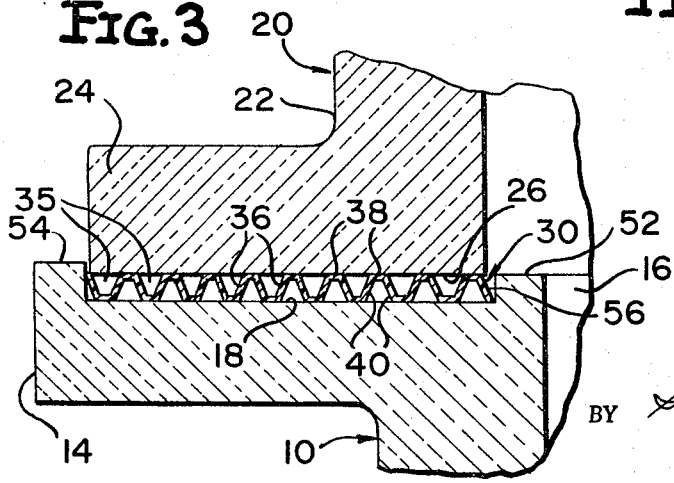
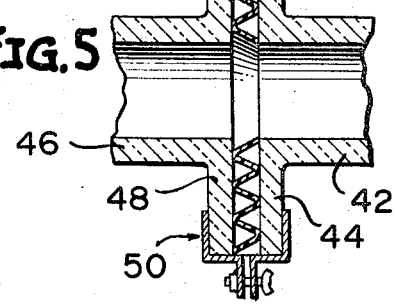
INVENTOR
EDWIN D. PHILLIPS
BY Shoemaker and Mattare
ATTORNEYS

United States Patent Office 3,332,566
Patented July 25, 1967

3,332,566
ACCESSORIES FOR CHEMICAL GLASSWARE APPARATUS
Edwin D. Phillips, 170 Albert St.,
North Plainfield, N.J. 07063
Filed Mar. 31, 1965, Ser. No. 444,198
2 Claims. (Cl. 215—40)

This invention relates primarily to chemical laboratory glassware and apparatus or structural units such as would be employed particularly in chemical laboratories or in the handling of chemicals and which would be constructed of glass.

It is, of course, well known that in chemical laboratories a major portion of the apparatus employed is constructed of glass, usually glass of a highly specialized character such as glass of the character known commercially as "Pyrex" which is designed to withstand high temperatures, sudden changes of temperature and many chemicals which ordinary common or lead glass would be affected by. Such articles or apparatus, may not only be glass receptacles but may be glass pipes or tubing.

Many such receptacles have glass lids or covers which are flanged to match a flange on the body of the receptacle and glass piping or tubing may have flanged joints and when the flanges of such joints are placed together or when the cooperating flanges of a receptacle lid and the top of a receptacle are placed together, it is a present practice to employ a sealing jelly or other substance between the opposed flanges to form an airtight seal or connection.

The use of a sealing jelly, grease or the like in the manner stated has many obvious disadvantages and also the cooperating flanges of the receptacle and lid or the cooperating flanges at joined ends of glass pipe sections must be drawn together with a suitable clamping means and this frequently results in breakage of expensive materials when glass-to-glass contact is made.

In view of the foregoing, it is a particular object of the present invention to provide a flat annular seal ring or gasket of synthetic resin plastic and of novel construction for placement between opposing faces of glass bodies of chemical laboratory aparatus or equipment, which will permit the bodies to be drawn or pressed tightly together without danger of fracturing the same and which, without the use of a sealing grease, jelly or the like, will establish an airtight seal between the opposing surfaces of the glassware.

Another object of the invention is to provide an improved annular seal or gasket formed of polytetrafluoroethylene synthetic resin, polystyrene or other high melting point resins which are highly inert chemically and resistant to the action of corrosive chemicals and generally form retaining and capable of yielding under slight pressure and which are chemically stable up to approximately 550° F. and physically stable at least approximately to 300° F.

Among such polytetrahaloethylene synthetic resins are polytetrafluoroethylene sold commercially under the name "Teflon." Accordingly in the use hereinafter and in the claims of the term "synthetic resin plastic" a plastic such as "Teflon" or the like having the physical characteristics stated is intended.

A still further object of the invention is to provide a flat annular synthetic resin plastic seal formed to have a series of concentric V ridges and channels, or ribs and grooves, in which the apices of the V ridges on both sides of the flat gasket are in a common plane and wherein such planes are parallel and the apices of the V ridges are in contact with opposing surfaces of the glass flanges between which the seal is positioned.

Other objects and advantages of the invention will become apparent as the description of the same proceeds and the invention will be best understood from a consideration of the following detailed description taken in connection with the accompanying drawings wherein:

FIG. 1 is an exploded view in perspective of a flanged or lipped jar and a flanged cap therefor and showing a synthetic resin sealing gasket being inserted or introduced into operative position between the parts which are to be sealingly joined together.

FIG. 2 is a view in perspective of the jar structure shown in FIG. 1 with the top or lid applied.

FIG. 3 is a partial section on an enlarged scale taken approximately on the line 3—3 of FIG. 2.

FIG. 4 is a plan view of a portion of the sealing ring gasket showing the concentric relationship of the V ridges and channels.

FIG. 5 illustrates the application of the invention between flanges of two joined pipe sections of glass or ceramic material.

Referring now more particularly to the drawings, there is shown in FIG. 1 a type of covered receptacle in connection with which the sealing gasket of the present invention is particularly designed to be used. It is to be understood, however, that while a specific type of receptacle or jar and cover therefor is here illustrated and will be described, this illustration and description is in no way intended to restrict or limit the invention in the area of its use. It will be readily apparent that the invention is adapted to be used in many different situations where there is a need for a seal between two flat opposing glass surfaces.

Again referring particularly to FIG. 1 the numeral 10 generally designates a glass receptacle known as a resin kettle.

The wall 12 of the receptacle 10 carries at the top thereof the relatively wide opening or receptacle mouth defining rim or flange 14, the receptacle mouth or opening being designated 16.

The rim or flange 14 has a relatively wide smooth flat top surface 18.

The numeral 20 generally designates the head or cap having the circular body portion 22 and a wide rim or flange 24, the bottom or under surface 26 of which is designed to rest upon the surface 18 of the flange 14.

In conventional usage of the kettle structure illustrated in FIG. 1 the surfaces 18 and 26 would be placed together with an intervening layer of a sealing substance such as silicon grease or the like commonly employed for establishing a sealing connection between opposing glass surfaces of chemical laboratory glassware and when the flanges are so placed together with the sealing substance between them a suitable clamp or holding clip may be applied to the flanges to draw the same relatively tightly together.

The numeral 30 generally designates a sealing gasket constructed in accordance with the present invention.

The gasket 30 is formed as a one-piece annular body, the outside or overall diameter of which would be such as to adapt it to a rim or flange of a jar so as to bring the outer periphery of the gasket to or flush with the outer periphery of the rim or flange 24 of the cap or other annular flange element in association with which the gasket may be used. Thus, for example, in a jar of the type illustrated in FIG. 1 the outside diameter of the gasket would be approximately equivalent to the outside diameter of the surface 18 of the flange or rim 14 on which the rim 24 is intended to rest and possibly the corresponding or opposing flange or rim 24 of the cap 22 as shown.

The inside diameter of the gasket would, of course, approximate the diameter of the mouth or opening 16 of the jar or, in the event that the gasket is used between flanges of glass pipe, the inside diameter of the gasket would approximate the inside diameter of the pipe at the flange end thereof.

The gasket 30 is formed of a synthetic resin plastic having the physical characteristics suitable for its particular use. Preferably, the gasket is formed of the plastic "Teflon" hereinbefore referred to and is substantially flat by which is meant that the planes of the top and bottom or opposite wide surfaces are parallel. While the thickness of the gasket between such parallel opposite surfaces may vary slightly depending upon the particular manner in which the gasket is to be used, it has been found that the most efficient and desirable thickness is approximately $10/100$ of an inch. As stated, since the thickness of the gasket may vary slightly, it is to be understood that in setting forth this figure it is not intended to limit the invention as to thickness, the figure stated being that which has been found to be most desirable.

While the gasket may be used or placed with either of its sides resting upon the surface 18, for example, it obviously would not have either a "top" or a "bottom" surface. However, for convenience of description, the opposite sides have the designating characters 32 and 34 applied thereto and in the position of use shown in FIG. 1, the side 32 could be referred to as the top side and the opposite side 34 could be referred to as the bottom side. Inversion of the gasket would then, of course, make the side 32 the bottom side and the side 34 the top side.

The wdith of the gasket between the inner and outer edges $x$ and $y$ may, of course, vary according to the width of the flange or flanges with which the gasket is to be used and accordingly no illustrative dimension can be given for such width.

The gasket in transverse section across the width $x-y$ presents a line of alternating upright and inverted V's. These are formed as a result of pressing, molding or cutting opposite sides of a blank of the plastic material in a series of concentric grooves or channels 35. These grooves or channels are, of course, V shaped in transverse section and lie concentrically side by side as will be readily apparent so that the alternating V shaped ribs 36 have alternating oppositely directed apices 38 and the channels are separated by the sloping walls 40 which are relatively thin, approximating in thickness $20/1000$ of an inch although it is to be understood that this is not a fixed value for the thickness of the wall as the thickness may vary slightly or be greater or less than this figure.

It will be seen from the illustration of the transverse section through the width of the gasket that the gasket has a substantially zigzag cross-sectional design or configuration. Also it will be seen in the illustration that the apices 38 of the concentric ribs on one side of the gasket contact one of the two opposing surfaces such, for example, as the surface 26 of the jar lid while the apices at the opposite side of the gasket are in contact with the surface 18 of the jar flange. When the gasket is placed in position between the opposing surfaces and pressure is applied in a direction to force the opposing surfaces together, the relatively thin walls 40 separating the annular grooves will be flexed so that the tips or apices of the ribs will be tightly pressed against the opposing glass surfaces and the gasket will thus establish a tight seal between these surfaces without the use of grease or other sealing material. If desired, a suitable coupling in the form of a clip or clamp may be applied to the flanges between which the seal is placed to maintain the slight compression of the gasket.

It will be obvious from the foregoing that whereas the description and illustration of the gasket and its manner of use have thus far been more or less restricted to the sealing of flanges of a jar mouth and jar cover or cap, the gasket may function efficiently for establishing a seal between other flat annular surfaces such, for example, as flanges of sections of glass pipe.

In FIG. 5 the flanged ends of two glass pipes are illustrated, the numeral 42 designating a portion of an end of one pipe which terminates in the relatively wide flange 44 while the numeral 46 designates a portion of another glass pipe which terminates in a relatively wide encircling flange 48.

For effectively sealing the opposing flanges 44 and 48 the flat, ribbed annular gasket of the present invention is placed between the opposing surfaces of the flanges and when the flanges are pressed together and held by suitable means such, for example, as a suitable type of clamp as illustrated and designated 50, a perfect fluid tight seal will be established between the adjacent ends of the pipes, which seal, being formed of a synthetic resin of the type described, will remain unaffected by heat or cold or chemical substances and will not wash out to permit leakage such as might occur in the use of conventional sealing greases.

In illustrating the application of the gasket between opposing surfaces of a jar or receptacle flange and the flange of a cap or cover therefor the resin kettle shown is of a design wherein the flange 14 of the body 12 has the concentric inner and outer lips 52 and 54 bordering the inner and outer sides of an annular recess 56, the width of which recess may be such as to receive the flange 24 of the jar cap 20.

The synthetic resin plastic gasket 30 is of a width to position relatively snugly in the annular recess 56 so that when the flange 24 is placed over the gasket and positions partly in the recess, resting upon the gasket the disposition of the parts will be as shown in FIG. 3 and the gasket may be readily compressed in the annular recess and held, as previously stated, by any suitable clamping means engaging the flanges 14 and 24.

In showing the gasket 30 disposed in a recess such as that designated 56, it is to be understood that while this may be a preferred application of the invention, the invention is not limited or restricted to use in a receiving means formed to have the gasket placed therein since, obviously, a good seal is obtainable by the use of the gasket of the design shown and claimed between any two flat opposing faces or surfaces such as the opposing surfaces 18 and 26 of the parts illustrated.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as the conjointly cooperative equivalents, are therefore intended to be embraced by those claims.

I claim:

1. A gasket comprising a flat one-piece annular body formed of a synthetic resin plastic having relatively wide top and bottom parallel surfaces as compared to the body thickness which is approximately $10/100$ of an inch, the gasket having grooves formed in each of said surfaces, the grooves being V-shaped in transverse section, the grooves being concentric with one another and lying side by side defining alternating V-shaped ribs having alternating oppositely directed apices and channels, the channels being separated by sloping walls that are relatively thin and of approximately $20/1000$ of an inch thickness so that the relatively thin walls separating the grooves will be flexed when pressure is applied in a direction to force the top and bottom surfaces of the gasket toward one another whereby the apices of the ribs will be tightly pressed against cooperating surfaces to establish a tight seal therewith.

2. In combination, a receptacle comprising a hollow body having an open top, said receptacle having a peripherally extending outwardly directed flange around the open end thereof, concentric inner and outer lips extending upwardly from said flange to define an annular recess, a cap for said open top and defining a flat annular undersurface of a dimension so as to fit within said annular recess, a gasket fitted within said recess and of such a width so as to substantially fill the entire width of said recess between said concentric lip, said gasket comprising a flat one-piece annular body formed of a synthetic resin plastic having relatively wide top and bottom parallel surfaces as compared to the body thickness which is approximately $10/100$ of an inch, the gasket having grooves formed in each of said surfaces, the grooves being V-shaped in transverse section, the grooves being concentric with one another and lying side by side defining alternating V-shaped ribs having alternating oppositely directed apices and channels, the channels being separated by sloping walls that are relatively thin and of approximately $20/1000$ of an inch thickness so that the relatively thin walls separating the grooves will be flexed when pressure is applied to the top and bottom surfaces of the gasket by the flange of said hollow body and the undersurface of said cap whereby the apices of the ribs will be tightly pressed against said flange and said undersurface to establish a tight seal therewith.

References Cited

UNITED STATES PATENTS

| | | | |
|---|---|---|---|
| 222,388 | 12/1879 | Doty | 285—363 X |
| 536,869 | 4/1895 | Gilbert | 215—89 |
| 587,876 | 8/1897 | Snow | 215—40 |
| 3,077,638 | 2/1963 | Hickam | 285—363 X |

FOREIGN PATENTS

| | | |
|---|---|---|
| 901,962 | 11/1944 | France. |
| 804,613 | 11/1958 | Great Britain. |
| 77,021 | 6/1950 | Norway. |
| 225,772 | 5/1943 | Switzerland. |
| 332,758 | 11/1958 | Switzerland. |

FRANKLIN T. GARRETT, *Primary Examiner.*